United States Patent
Blinn et al.

(10) Patent No.: US 9,929,995 B2
(45) Date of Patent: Mar. 27, 2018

(54) THIRD PARTY MESSAGING SYSTEM FOR MONITORING AND MANAGING DOMAIN NAMES AND WEBSITES

(71) Applicant: Go Daddy Operating Company, LLC, Scottsdale, AZ (US)

(72) Inventors: Arnold Blinn, Hunts Point, WA (US); Nitin Gupta, Mountain View, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 14/814,726

(22) Filed: Jul. 31, 2015

(65) Prior Publication Data

US 2015/0341298 A1 Nov. 26, 2015

Related U.S. Application Data

(63) Continuation-in-part of application No. 14/284,322, filed on May 21, 2014.

(51) Int. Cl.
*H04L 12/58* (2006.01)
*H04W 12/06* (2009.01)
*H04W 4/14* (2009.01)

(52) U.S. Cl.
CPC ............. *H04L 51/18* (2013.01); *H04W 12/06* (2013.01); *H04W 4/14* (2013.01)

(58) Field of Classification Search
CPC .......... H04L 51/18; H04W 12/06; H04W 4/14
See application file for complete search history.

(56) References Cited

U.S. PATENT DOCUMENTS

| | | | | |
|---|---|---|---|---|
| 6,061,792 A | * | 5/2000 | Simon | G06Q 30/06 705/76 |
| 6,141,750 A | * | 10/2000 | Micali | G06Q 20/00 713/168 |
| 6,263,352 B1 | | 7/2001 | Cohen | |

(Continued)

OTHER PUBLICATIONS

Review of Personalization Technologies: Collaborative Filtering vs. ChoiceStream's Attributized Bayesian Choice Modeling. ChoiceStream. http://www.choicestream.com/pdf/ChoiceStream_TechBrief.pdf. Apr. 2004.

(Continued)

*Primary Examiner* — Philip Chea
*Assistant Examiner* — Wuji Chen
(74) *Attorney, Agent, or Firm* — Quarles & Brady LLP

(57) ABSTRACT

A method is disclosed for a domain name registrar or a website hosting provider to authenticate a user as having authority to manage an account. The user may enter a selected messaging system for receiving and sending messages. The domain name registrar or the website hosting provider may monitor one or more events (such as an expiration of a domain name or a usage of a resource permitted by a website). When one or more events occur, a notice with various options may be sent to the user via the selected messaging system. The selected action may be received and performed by the domain name registrar or the website hosting provider. A confirmation message may be sent to the user regarding the results of the domain name registrar or the website hosting provider performing the selected action.

7 Claims, 11 Drawing Sheets

(56) References Cited

U.S. PATENT DOCUMENTS

| | | | |
|---|---|---|---|
| 6,263,436 B1* | 7/2001 | Franklin | G06Q 20/02 713/167 |
| 6,313,835 B1 | 11/2001 | Gever et al. | |
| 6,601,057 B1 | 7/2003 | Underwood et al. | |
| 6,697,825 B1 | 2/2004 | Underwood et al. | |
| 7,111,229 B2 | 9/2006 | Nicholas et al. | |
| 7,143,290 B1* | 11/2006 | Ginter | G06F 21/6209 348/E5.006 |
| 7,152,207 B1 | 12/2006 | Underwood et al. | |
| 7,171,559 B1* | 1/2007 | Bao | H04L 9/3013 713/169 |
| 7,668,913 B1 | 2/2010 | Underwood et al. | |
| 7,680,901 B2 | 3/2010 | Rechterman et al. | |
| 7,770,122 B1 | 8/2010 | Shaik | |
| 7,886,221 B1 | 2/2011 | Underwood et al. | |
| 8,136,027 B2 | 3/2012 | Underwood et al. | |
| 8,380,800 B2* | 2/2013 | Ruiz | G06Q 30/0217 705/1.1 |
| 8,595,300 B2 | 11/2013 | Underwood et al. | |
| 8,677,234 B2 | 3/2014 | Underwood et al. | |
| 2002/0091827 A1* | 7/2002 | King | G06Q 40/04 709/226 |
| 2002/0099936 A1* | 7/2002 | Kou | H04L 63/0442 713/151 |
| 2002/0156895 A1* | 10/2002 | Brown | G06Q 10/00 709/226 |
| 2003/0130875 A1* | 7/2003 | Hawash | G06Q 30/02 705/3 |
| 2003/0220979 A1 | 11/2003 | Hejl | |
| 2004/0006538 A1* | 1/2004 | Steinberg | G06Q 20/10 705/39 |
| 2004/0073790 A1* | 4/2004 | Ateniese | G06F 21/606 713/165 |
| 2004/0132431 A1 | 7/2004 | Vandermeijden et al. | |
| 2004/0199620 A1* | 10/2004 | Ruiz | H04L 29/12009 709/223 |
| 2004/0240642 A1* | 12/2004 | Crandell | H04L 51/12 379/88.22 |
| 2004/0249978 A1 | 12/2004 | Marappan et al. | |
| 2005/0144323 A1* | 6/2005 | Gardos | H04L 29/12594 709/245 |
| 2006/0094454 A1 | 5/2006 | Kim | |
| 2006/0107256 A1* | 5/2006 | Zarenin | G06F 21/105 717/127 |
| 2006/0174199 A1 | 8/2006 | Soltis et al. | |
| 2006/0200751 A1 | 9/2006 | Underwood et al. | |
| 2007/0011248 A1 | 1/2007 | Kalervo et al. | |
| 2007/0094304 A1* | 4/2007 | Horner | G06Q 10/10 |
| 2007/0112950 A1* | 5/2007 | Parsons | G06Q 10/10 709/223 |
| 2007/0157018 A1 | 7/2007 | Simon et al. | |
| 2007/0214284 A1* | 9/2007 | King | G06Q 40/04 709/245 |
| 2007/0282951 A1* | 12/2007 | Selimis | H04L 67/06 709/205 |
| 2007/0300057 A1 | 12/2007 | Corcoran et al. | |
| 2008/0066080 A1* | 3/2008 | Campbell | G06F 17/3089 719/314 |
| 2008/0227435 A1 | 9/2008 | Six et al. | |
| 2008/0235319 A1* | 9/2008 | Zargham | G06F 17/30569 709/201 |
| 2008/0270418 A1 | 10/2008 | Chen et al. | |
| 2009/0012885 A1* | 1/2009 | Cahn | G06Q 30/0283 705/34 |
| 2009/0075696 A1* | 3/2009 | Kanapur | G06F 17/30861 455/557 |
| 2009/0177549 A1* | 7/2009 | Ruiz | G06Q 30/0217 705/14.19 |
| 2009/0216577 A1 | 8/2009 | Killebrew | |
| 2009/0240812 A1* | 9/2009 | King | G06Q 40/04 709/226 |
| 2009/0287701 A1 | 11/2009 | Breaker et al. | |
| 2009/0313374 A1* | 12/2009 | Murphy | H04L 67/2847 709/226 |
| 2010/0106616 A1* | 4/2010 | Adelman | G06Q 10/06 705/26.1 |
| 2010/0115043 A1* | 5/2010 | King | G06Q 40/04 709/206 |
| 2010/0287254 A1* | 11/2010 | Ruiz | G06Q 30/0217 709/206 |
| 2010/0287484 A1* | 11/2010 | Ruiz | G06Q 30/0217 715/760 |
| 2011/0060793 A1 | 3/2011 | Wheeler et al. | |
| 2011/0148625 A1* | 6/2011 | Velusamy | G08B 13/1427 340/539.13 |
| 2011/0151890 A1* | 6/2011 | Platt | G06Q 10/107 455/456.1 |
| 2011/0223945 A1* | 9/2011 | Bhatnagar | H04L 51/14 455/466 |
| 2012/0079047 A1* | 3/2012 | Sunkara | H04L 29/12632 709/206 |
| 2012/0101952 A1* | 4/2012 | Raleigh | G06Q 30/016 705/304 |
| 2012/0221657 A1 | 8/2012 | Zeevi et al. | |
| 2012/0226606 A1* | 9/2012 | Brown | G06F 21/33 705/40 |
| 2012/0296756 A1* | 11/2012 | Shah | G06Q 30/00 705/26.2 |
| 2012/0297451 A1* | 11/2012 | Ozzie | H04L 63/08 726/3 |
| 2013/0055390 A1* | 2/2013 | Bennett | G06F 17/30864 726/22 |
| 2013/0091172 A1* | 4/2013 | Kelesis | G06F 17/30165 707/785 |
| 2013/0210468 A1* | 8/2013 | Lowther | H04W 4/12 455/466 |
| 2013/0318177 A1* | 11/2013 | Tan | H04L 43/08 709/206 |
| 2013/0318589 A1* | 11/2013 | Ford | H04L 63/08 726/7 |
| 2013/0321912 A1* | 12/2013 | Igler | G02B 27/2214 359/463 |
| 2014/0122592 A1* | 5/2014 | Houston | H04L 67/1095 709/204 |
| 2014/0165176 A1* | 6/2014 | Ow | H04L 63/10 726/8 |
| 2014/0250198 A1 | 9/2014 | Jorasch et al. | |
| 2015/0271122 A1* | 9/2015 | Jalisatgi | H04L 51/18 713/158 |
| 2017/0041296 A1* | 2/2017 | Ford | H04L 63/0421 |

OTHER PUBLICATIONS

Website Personalization: An Empirical Study of Novice and Expert Users on MyYahoo.com. http://www.doug-info.com/papers/personalization.him. Fall 2000.

Personalization is Over-Rated. http://www.useit.com/alertbox/981004.html. Oct. 4, 1998.

Novice vs. Expert Users. http://www.useit.com/alertbox/20000206.htm. Feb. 6, 2000.

Intranet Portals: A Tool Metaphor for Corporate Information. http://www.useit.com/alertbox/20030331.html. Mar. 31, 2003.

The personalization story. ITworld.com. http://www.itworld.com/Man/2676/ITWO 0511rosenberg/pfindex.html. May 11, 2001.

* cited by examiner

United States Patent US 9,929,995 B2

THIRD PARTY MESSAGING SYSTEM FOR MONITORING AND MANAGING DOMAIN NAMES AND WEBSITES

CROSS-REFERENCE TO RELATED PATENT APPLICATIONS

This application is a continuation-in-part of, and claims priority to, U.S. patent application Ser. No. 14/284,322 entitled Dynamically Updating Website Content or Web Service Via Text Messaging filed on May 21, 2014.

FIELD OF THE INVENTION

The present invention generally relates to the field of domain name registrars and website hosting providers managing domain names and websites using third party messaging systems.

SUMMARY OF THE INVENTION

The present invention may provide methods for a user to update any service backend command using a text message, such as the user's website content or the user's web service(s) by transmitting a text message to a web service provider or updating inventory details in a product database.

The web service provider may have a text service to receive the text message at a text phone number. In preferred embodiments, the text service has a plurality of text phone numbers that may be called by the user using a text device. In these embodiments, the text service may produce different action codes based on which text phone number was called. The text device may be, as a non-limiting example, a cell phone having a user phone number.

The text service may produce an action code based, at least in part, on the text message, the text phone number called, the user phone number or some combination thereof. The text service may determine the user, the user's account, the user's services or the user's website associated with the text message based on the user phone number or the text message.

The text service may transmit the action code, through one or more hosting servers, to the user's website. In preferred embodiments, the user's website includes a plugin that may receive the action code and the plugin may alter the website in some manner (such as altering the website code or changing the template for the website) based on the received action code.

The altered website is preferably published without the user taking any action other than sending the original text message. In another embodiment, the user may be allowed to confirm any alterations made to the website before publishing the altered website.

In another embodiment, two users (using deferent text devices having different user phone numbers) may send text messages (the same or different) to the same text phone number in the text service, but the text service may produce different action codes based on the different user phone numbers. In other words, the action codes may be based on the text message in combination with the different user phone numbers.

In the same embodiment or in a different embodiment, the same user (using a single text device) may send text messages (the same or different) to two different text phone numbers, in a plurality of text phone numbers, to produce two different action codes. As another example, the same user may send two different text messages to the same text phone number, in a plurality of text phone numbers, to produce two different action codes. In other words, the action codes may be based on the text message in combination with the different text phone numbers called by the user.

In another embodiment, a domain name registrar may authenticate a registrant of a domain name as having an authority to manage an account with the domain name registrar. The domain name registrar may receive from the registrant a selected messaging system (such as a third party messaging system) to be associated with the account. The domain name registrar may monitor for the domain name to expire within a selected time period unless action is taken by the registrant.

Upon the domain name registrar detecting the domain name will expire within the selected time period unless action is taken by the registrant, the domain name registrar may send a notice by the selected messaging system to the registrant. The notice preferably comprises a plurality of actions that the registrant may select to be taken. The domain name registrar may receive a selected action from the plurality of actions from the registrant via the selected messaging system. The domain name registrar may send a first confirmation message by the selected messaging system to the registrant that the domain name registrar received the selected action from the registrant. The domain name registrar may perform the selected action. The domain name registrar may then send a second confirmation message to the registrant by the selected messaging system that the domain name registrar performed the selected action.

In another embodiment, a website hosting provider may authenticate a user of a website as having an authority to manage an account with the website provider. In preferred embodiments, this is a one-time authentication process that does not need to be repeated. The website hosting provider may receive from the user a selected messaging system to be associated with the account. The website hosting provider may monitor for the website to exceed a predetermined percentage of resources allowed for the website (such as 75% of the allotted bandwidth or 90% of the allotted memory).

Upon the website hosting provider detecting the website exceeded the predetermined percentage of resources allowed for the website, the website hosting provider may send a notice by the selected messaging system to the user. The notice may comprises a plurality of actions that the user may select to be taken. The website hosting provider may receive a selected action from the plurality of actions via the selected messaging system from the user. The website hosting provider may send a first confirmation message by the selected messaging system that the website hosting provider received the selected action from the user. The website hosting provider may perform the selected action. The website hosting provider may then send a second confirmation message to the user by the selected messaging system that the website hosting provider performed the selected action.

As described before, the text service may determine the user, user's account, user's services or user's website based on the user phone number and/or text message and/or message content and then transmit the action code(s) to one or more hosting servers hosting the user's website or services (even running a script). The user's website may be one out of a plurality of different websites hosted by the hosting server(s) and may have a plugin that alters the user's website based on the action code. The user's altered website may be published, either with or without further action or confirmation from the user.

In another embodiment, a user may alter a web service via a text message. In this embodiment, a text service, running on one or more hardware servers, may receive over a network a text message sent to a text phone number from a text device by a user. The text device may have a user phone number.

The text service may produce an action code based on the text message, the user phone number, the text phone number or some combination thereof.

The text service may determine the user, user's account, user's web services or other identification information based on the user phone number and/or the text message. The text service may transmit the action code to, as a non-limiting example, an exposed API on one or more web servers and the one or more web servers may alter, possibly through the use of a plugin or other code, one or more of the user's web services.

The above features and advantages of the present invention will be better understood from the following detailed description taken in conjunction with the accompanying drawings.

DETAILED DESCRIPTION

Figure 1:
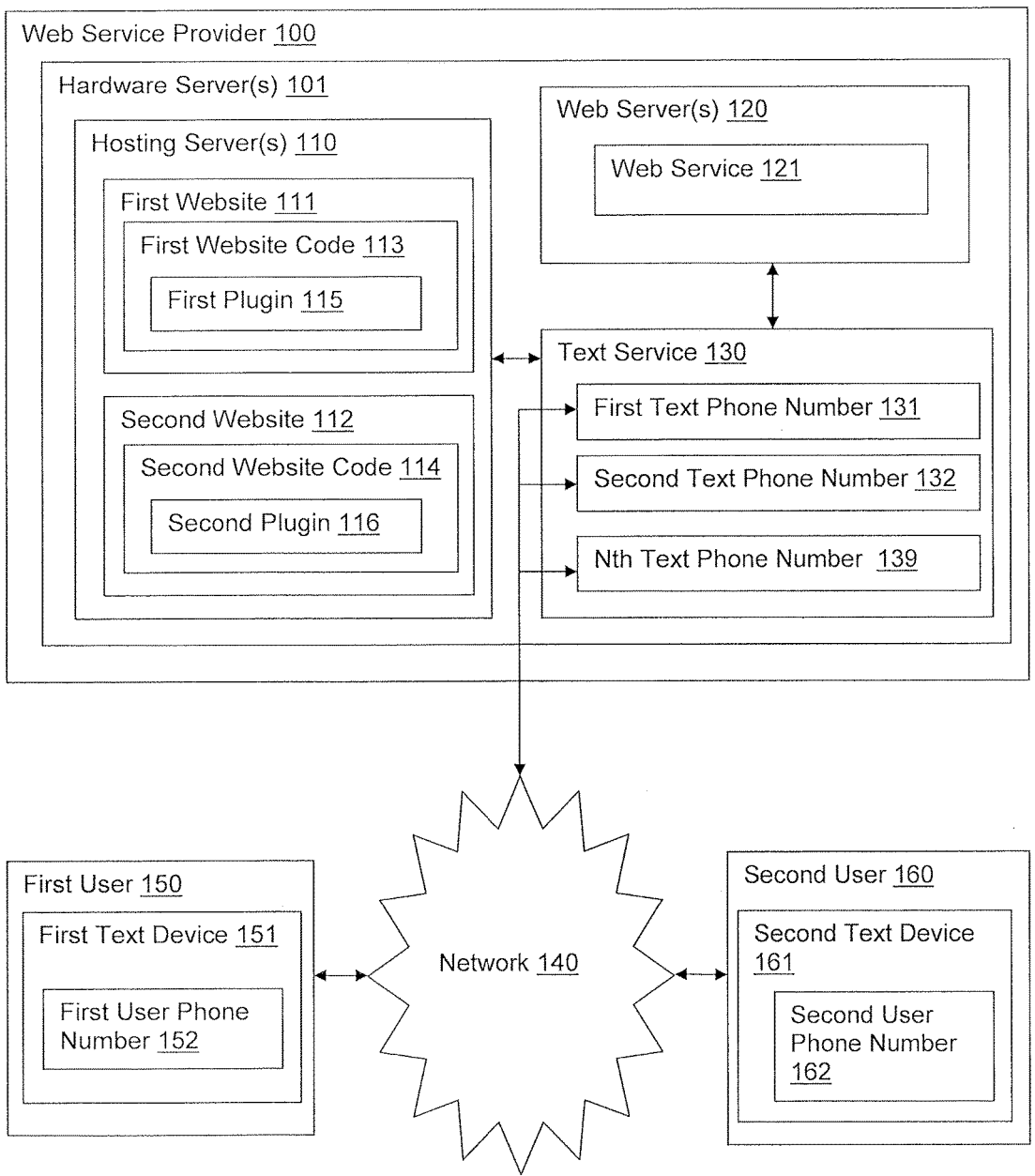
FIG. 1 is a block diagram of a system that may be used to practice the present invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to practice the present invention. Network 140 is a collection of links and nodes (e.g., multiple computers and/or other devices connected together) arranged so that information may be passed from one part of the network 140 to another over multiple links and through various nodes. Examples of networks 140 include the Internet, the public switched telephone network, the global Telex network, computer networks (e.g., an intranet, an extranet, a local-area network, or a wide-area network), wired networks, wireless networks, cell phone networks and/or combinations thereof.

The Internet is a worldwide network of computers and computer networks arranged to allow the easy and robust exchange of information between people on clients running browsers. Hundreds of millions of people around the world have access to computers connected to the Internet via Internet Service Providers (ISPs).

Content providers place multimedia information (e.g., text, graphics, audio, video, animation, and other forms of data) at specific locations on the Internet referred to as websites 111, 112. The combination of all the websites 111, 112 and their corresponding web pages on the Internet is generally known as the World Wide Web (WWW) or simply the Web.

For Internet users and online businesses, the Internet continues to be increasingly valuable. People use the Internet for everyday tasks, from social networking, shopping, banking, and paying bills to consuming media and entertainment. E-commerce is growing, with businesses delivering more services and content across the Internet, communicating and collaborating online, and inventing new ways to connect with each other. Each online business may have one or more websites and many online businesses will also have a brick-and-mortar presence.

Prevalent on the Internet are websites 111, 112 which offer and sell goods and services to individuals and organizations. The websites 111, 112 may consist of a single webpage, but typically consist of multiple interconnected and related webpages. Websites 111, 112, unless very large and complex or have unusual traffic demands, may typically reside on a single hardware server 101 and are prepared and maintained by a single individual or entity (although websites 111, 112 residing on multiple hardware servers 101 are certainly possible). Menus, links, tabs, etc. may be used to move between different web pages within a website 111, 112 or to move to a different website 111, 112 altogether.

Websites 111, 112 may be created using website code 113, 114, which may comprise HyperText Markup Language (HTML) to generate a standard set of tags that define how the webpages for the websites 111, 112 are to be displayed.

Users of the Internet may access online businesses' websites 111, 112 using software known as an Internet browser, such as MICROSOFT INTERNET EXPLORER, MOZILLA FIREFOX or GOOGLE CHROME. After the browser has located the desired webpage, the browser may request and receive information from the website 111, 112, typically in the form of an HTML document, and then display the website content for the user. The user may then view other webpages at the same website 111, 112 or move to an entirely different website 111, 112 using the browser 102.

For purposes of this specification and claims, a plugin 115, 116 is defined as a software component (including a widget) that adds a specific feature to an existing software application. A plug-in 115, 116 thus defined for the present invention may be able to receive an action code from a text service 130 and alter a website 111, 112 based on the action code. In other embodiments, an exposed API may be able to receive the action code from the text service 130 and alter the website 111, 112 or a web service 121 based on the action code. As non-limiting examples, the action code may be used for blogging, advertising a special offer or scheme, updating content, updating a price, updating inventory or any other change or alteration that is normally permitted on a website 111, 121 as part of the administration of a website 111, 121 or altering or administering a web service 121.

The websites 111, 121 may be hosted or operated by hosting server(s) 110 providing hosting services. The hosting server(s) 110 may be, as non-limiting examples, one or more Dell PowerEdge(s) rack server(s), HP Blade Server(s), or IBM Rack or Tower server(s), although other types or combination of servers may also be used. The hosting server(s) 110 may provide the electronic hardware to run computer programs that may be written to perform various functions and processes.

Some online businesses, typically those that are larger and more sophisticated, may provide their own hardware, software, and connections to the Internet to operate their own websites 111, 112. But many online businesses either do not have the resources available or do not want to create and maintain the infrastructure necessary to host their own websites 111, 112. To assist such online businesses, web service providers 100 exist that offer website hosting services. These hosting providers typically provide the hardware, software, and electronic communication equipment necessary to connect multiple websites 111, 112 to the Internet. A single web service provider 100 may literally host thousands of websites 111, 112 on one or more hardware servers 101.

A web service provider 100 may use hardware server(s) 101, software, routers, communication equipment, etc. to perform various web applications and services, possibly running in the cloud. Non-limiting examples of web services include domain name searches, domain name registration, domain name transfers, domain name auctions and domain name management, purchasing, managing and installing SSL certificates and social networking. Any other web service, now known or developed in the future, may also be altered based on an action code.

Unfortunately, not every user 150, 160 has easy access to the Internet which typically requires an Internet Service Provider (ISP) and an Internet capable device. However, some users 150, 160 that may not have access to the Internet, may still be able to send text messages from a text device 151, 161.

Text messaging, or texting, may comprise the act of composing and sending a brief, electronic message between two or more text devices 151, 161, such as mobile phones, or fixed or portable devices over a network 140. Text messaging may refer, for example, to messages sent using the Short Message Service (SMS). It may also refer to messages containing image, video, and sound content (such as Multimedia Messaging Service (MMS) messages). MMS is a standard way to send messages that include multimedia content to and from mobile phones. This allows one or more images to also convey information in a manner similar to the text message. MMS extends the core capability of SMS that allowed exchange of text messages only up to 160 characters in length. The sender of a text message may be known as a user 150, 160 or texter.

The text messages of the present invention may be sent by any known or later developed protocol. In a preferred embodiment, the text messages are sent in the SMS or MMS protocol although other text message protocols may also be used. SMS is a text messaging service component of phone, Web, or mobile communication systems. SMS uses standardized communication protocols to allow fixed line or mobile phone devices to exchange short text messages. Though most SMS messages are mobile-to-mobile text messages, support for the service has expanded to include other mobile technologies, such as ANSI CDMA networks and Digital AMPS, as well as satellite and landline networks.

A users 150, 160 of the invention may have access to a text device 151, 161. The text device 151, 161 typically will be a cell phone, but may be any device with text capability. The text device 151, 161 may have a user phone number 152, 162. The user 150, 160 will typically be an owner, the owner's agent, or another person associated with a website or application 111, 112 hosted on the one or more hosting servers 110.

The text service 130 may comprise one or more hardware servers that comprise servers and telecommunication equipment able to receive and route text messages sent to one or more text phone numbers 131-139. The text phone numbers 131-139 may be called by a plurality of users 150, 160 from a plurality of text devices 151, 161 over a network 140. Each text device 151, 161 may have a user phone number 152, 162. The text service 130 may operate on one or more hardware servers 101 that provide a platform for one or more software packages. The software packages may perform the various functions herein described for the text service 130. The software packages may be written in any software language.

The text service 130 is preferably able to receive a text message, determine the user phone number 152, 162 from the text device 151, 161 that called the text service 130 and determine which text phone number 131, 132, 139 received the call from the user 150, 160. The text service 130 may also be able to determine a particular website 111, 121 out of a plurality of websites or a web service 121 that the text message is intended for based on the user phone number 152, 162 and/or the text message. In some embodiments, the text message may include an account identification and/or a password The text service 130 may be able to produce an action code based on the text message, the text phone number 131, 132, 139 called, the user phone number 152, 162 or some combination thereof. The action code may be the same as the text message, or may be formatted by the text service 130 for easier consumption by a plugin 115, 116 associated with the website 111, 112 or a web service 121.

The action code may comprise one or more commands (such as change price) and/or one or more parameters (such as the new price). Action codes may include user/business specific information (such as an update to one or more promotions) or may be generic (such as shutdown). Action codes may be used to update a store front. Action codes may be an alpha-numeric character string. As a specific, non-limiting example, the action code may be "update price item A, $3.00". In this example, the "update price item A," may be a command and the "$3.00" may be a parameter.

Action codes may be executed immediately upon receipt. In other embodiments, action codes may be scheduled to be executed at a particular time, queued up based on a priority system (such as the order the action code was received) and/or the action codes may be rolled back.

In another embodiment, an action code may comprise a query that causes a website 111, 112, a plugin 115, 116 or a web service 121 to send a text message back to the user 150, 160 on the text device 151, 161 in response to the query. As non-limiting examples, the action code may pull data by sending an action code that requests which promotion is currently being listed or that requests how many unique visitors visited the website 111, 112 today. An action code may be a predetermined alpha numeric string used to represent any query desired by the user 150, 160 for the website 111, 112 or web service 121.

Figure 2:
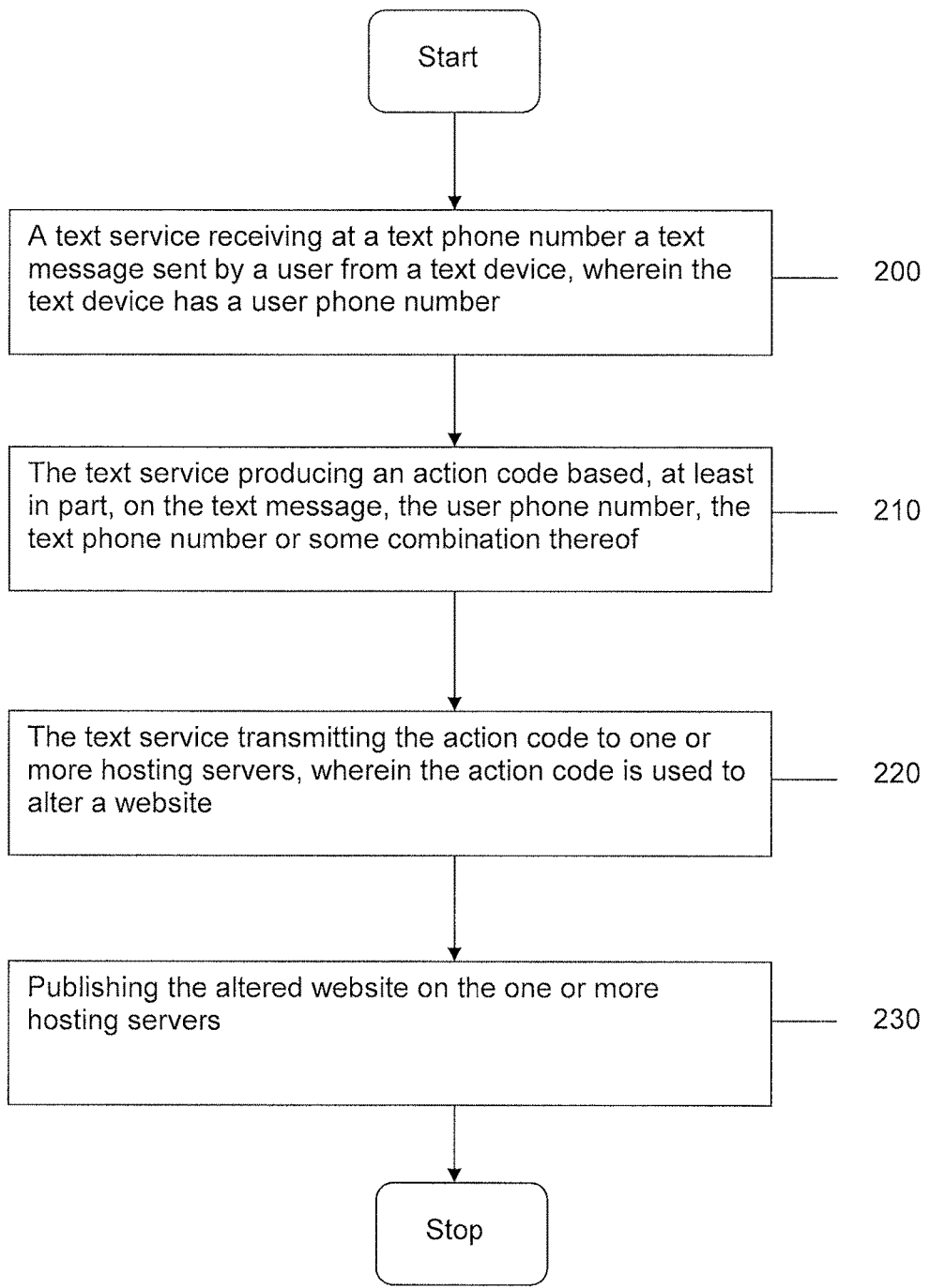
FIG. 2 is a flow diagram illustrating a first embodiment of a user modifying a website based on a text message sent to a text service.

FIG. 2 illustrates a possible method for practicing the invention. A text service 130 may receive over a network 140 (such as a cell phone network) a text message sent to a text phone number 131, 132, 139 from a text device 151 by a first user 150. The text device 151 preferably has a first user phone number 152. (Step 200) The text service 130 may determine a website 111, from a plurality of websites 111, 112, that is intended to be altered by the text message based on the user phone number 152.

The text service 130 may produce an action code based, at least in part, on the text message, the text phone number 131, 132, 139 called by the first user 150, the first user phone number or some combination thereof. (Step 210) The text service 130 may support one or more text phone numbers 131, 132, 139. As a non-limiting example, if the text service 130 supports 10 text phone numbers 131, 132, 139, each of the 10 text phone numbers 131, 132, 139 may be used to represent a different command, e.g. the first text phone number 131 may represent command 1 (change a price), the second text phone number 132 may represent command 2 (start a new ad campaign) and so on for any number of desired text phone numbers 131, 132, 139.

In addition, the text phone numbers 131, 132, 139 may be shared by one or more users 150, 160. In one embodiment, a text message sent to a first text phone number 131 may represent one action code (command 1) when sent from a first user phone number 152 and may represent a second different action code (command 2) when sent from a second user phone number 162. This embodiment would allow the text phone numbers 131, 132, 139 to be shared by all the users 150, 160 of the text service 130 and yet, at the same time, be customized for each user 150, 160.

The text service 130 may transmit the action code to one or more hosting servers 110, wherein the action code is used to alter a first website 111. (Step 220) In preferred embodiments, the first website 111 may have a first plugin 115. The first plugin 115 may be a widget and/or computer code associated with the first website 111. The first plugin 115 may receive the action code and update the content of the first website 111 based on the action code, which may be an alpha-numeric character sting.

As specific non-limiting examples, the action code may be used to alter the first website 111 by changing/adding/deleting a message, changing/adding/deleting a price, changing a template, changing/adding/deleting a graphic, blogging, performing customer service or support and/or changing/adding/deleting a promotion. In certain embodiments, the action code may be specific to the business operated from the first website 111 or may be in a standard format used by a plurality of websites 111, 112. The altered website 111 may be published on the one or more hosting servers 110. (Step 230)

Figure 3:
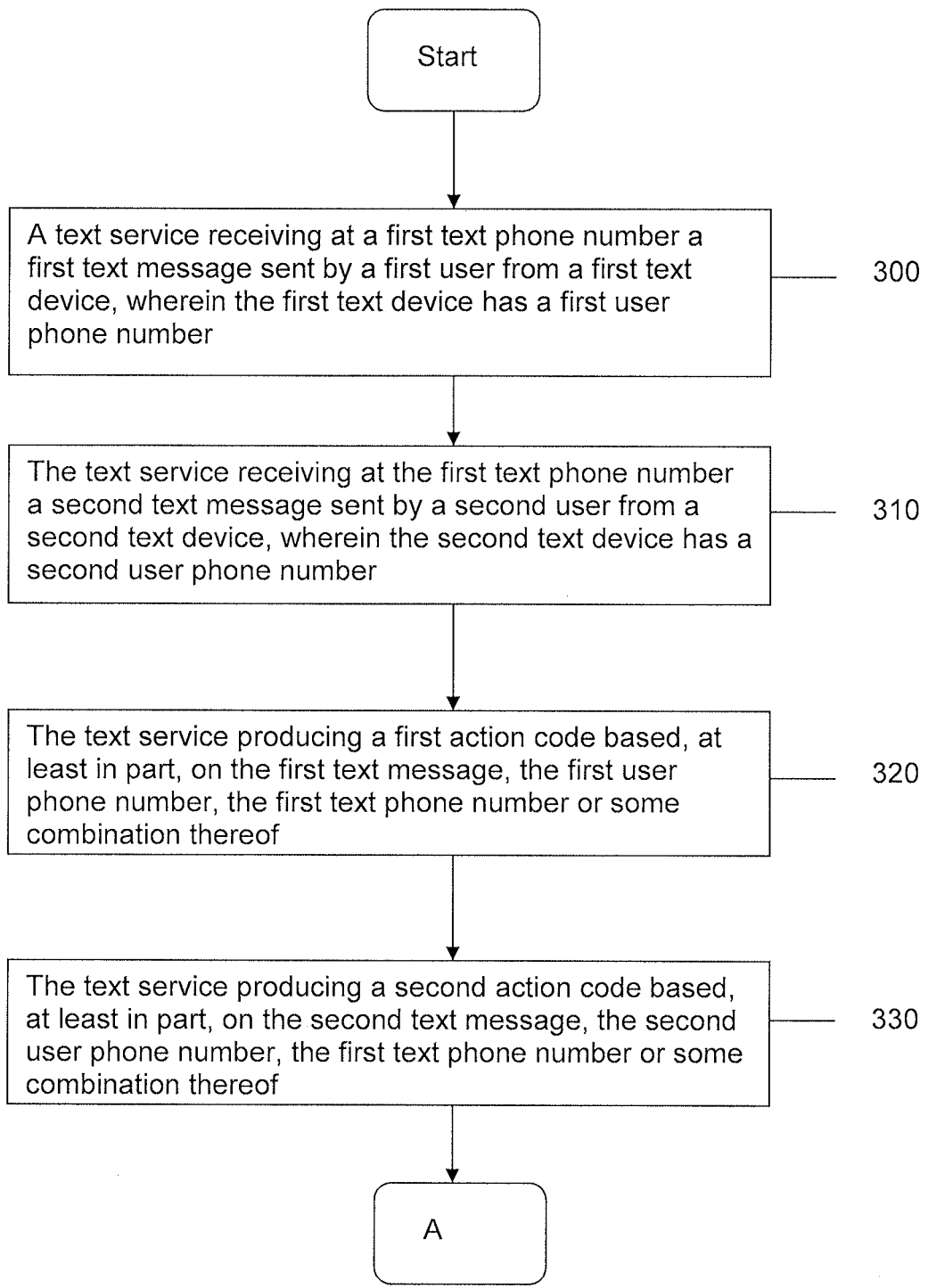
FIGS. 3 and 4 are flow diagrams illustrating a second embodiment of a plurality of users modifying a plurality of websites based on a plurality of text messages sent to the text service.
Figure 4:
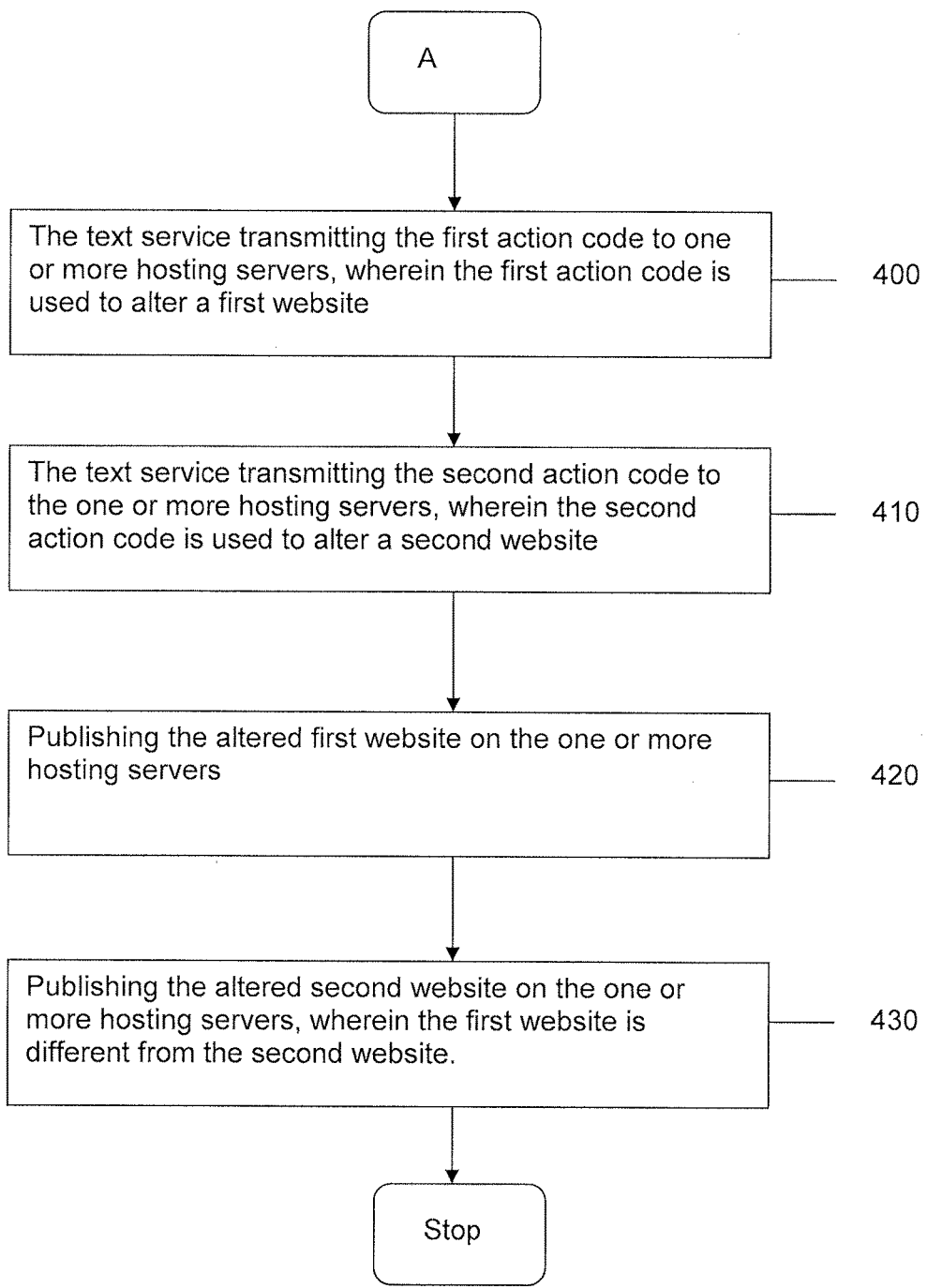

FIG. 3 and FIG. 4 illustrate another possible embodiment for practicing the invention. This embodiment illustrates that the invention may be practiced by a plurality of users 150, 160 during the same time period. The method may start with the text service 130, running on one or more hardware servers 101, receiving over a network 140 a first text message sent to a first text phone number 131 from a first text device 151 by a first user 150, wherein the first text device 151 may have a first user phone number 152. (Step 300) The text service 130 may also receive over the network 140 a second text message sent to the first text phone number 131 from a second text device 161 by a second user 160, wherein the second text device 161 may have a second user phone number 162. (Step 310) The first text message may be the same or different from the second text message.

In a preferred embodiment, the first text phone number 131 is merely one text phone number 131 in a plural of text phone numbers 131, 132, 139 that may be called by a plurality of users 150, 160. In other embodiments, each text phone number, in the plurality of text phone numbers 131, 132, 139, may be used to produce a different action code when called by a text device 151, 161.

The text service 130 may produce a first action code based, at least in part, on the first text message, the first text phone number 131, the first user phone number 152 or some combination thereof. (Step 320) In a similar manner, the text service 131 may produce a second action code based, at least in part, on the second text message, the first text phone number 131, the second user phone number 162 or some combination thereof. (Step 330) The first action code may be the same or different from the second action code. In preferred embodiments, the text service 130 may determine the first website 111 (or an identity of the first user 150 or an account associated with the first user 150) out of a plurality of websites 111, 112 hosted on the one or more hosting servers 110, based on the first user phone number 152 and/or text message. Likewise the text service 130 may determine the second website 112 (or an identity of the second user 160 or an account associated with the second user 160) out of the plurality of websites 111, 112 hosted on the one or more hosting servers 110, based on the second user phone number 162 and/or text message.

The text service 130 may transmit the first action code to one or more hosting servers 110, wherein the first action code is used to alter a first website 111. (Step 400) The text service 130 may transmit the second action code to the one or more hosting servers 110, wherein the second action code is used to alter a second website 112. (Step 410) Transmitting the first and second action codes through the hardware servers 101 to the first or second websites 111, 112, the first or second website code 113, 114 or the first or second plugin or widget 115, 116 may be accomplished using any protocol, communication technique or technology currently known or developed in the future. Software on the hosting servers 110, website code 113, 114, text service 130, plugin 115, 116 may be used to alter the website 111, 112 based on the action code (which may be the same or similar to the text message in simplified embodiments). The alteration may include, as non-limiting examples, the appearance of the website 111, 112 (such as a price listing, image, content, text coloring or size, template used, ads, promotions, etc.) or a management feature (such as the amount of bandwidth allowed, hosting technology used, software packages enables, widgets or plugins used by the website 111, 112, etc.).

After the first and second websites 111, 112 have been altered, the first and second websites 111, 112 may be published on one or more hosting servers 101. The altered websites 111, 112 may be published either automatically after sending the text messages or after a confirmation from the first user 150 for the first website 111 and a confirmation from the second user 160 for the second website 112. (Step 420) In other embodiments, the altered website 111, 112 does not need to be (re)published. For example, if the action code updated a database (such as a price for an item) the change could go live by design in real-time without having to (re)publish the website 111, 112, In some embodiments, the same text message may produce different action codes and/or different alterations to the first website 111 and the second website 112. This may be possible if the text service 130 allows one or more users 150, 160 to define different commands to the same text message. As an example, a text message of "1", received from the first text device 151 having the first phone number, may initiate or trigger a new ad campaign on the first website 111 while the same text message of "1", received from the second text device 161 having the second user phone number, may lower all prices on the second website 112 by 10%. (Step 430) In other embodiments, the text messages may be made standard, so that all users 150, 160 that send in the same text message, such as "1", will have the same alterations made to their websites 111, 112. A hybrid system allowing both custom and standard text messages is also contemplated by the invention. In addition, one or more website alterations may be conveyed by a single text message and any number of text messages may be sent to the text service 130 as desired.

Figure 5:
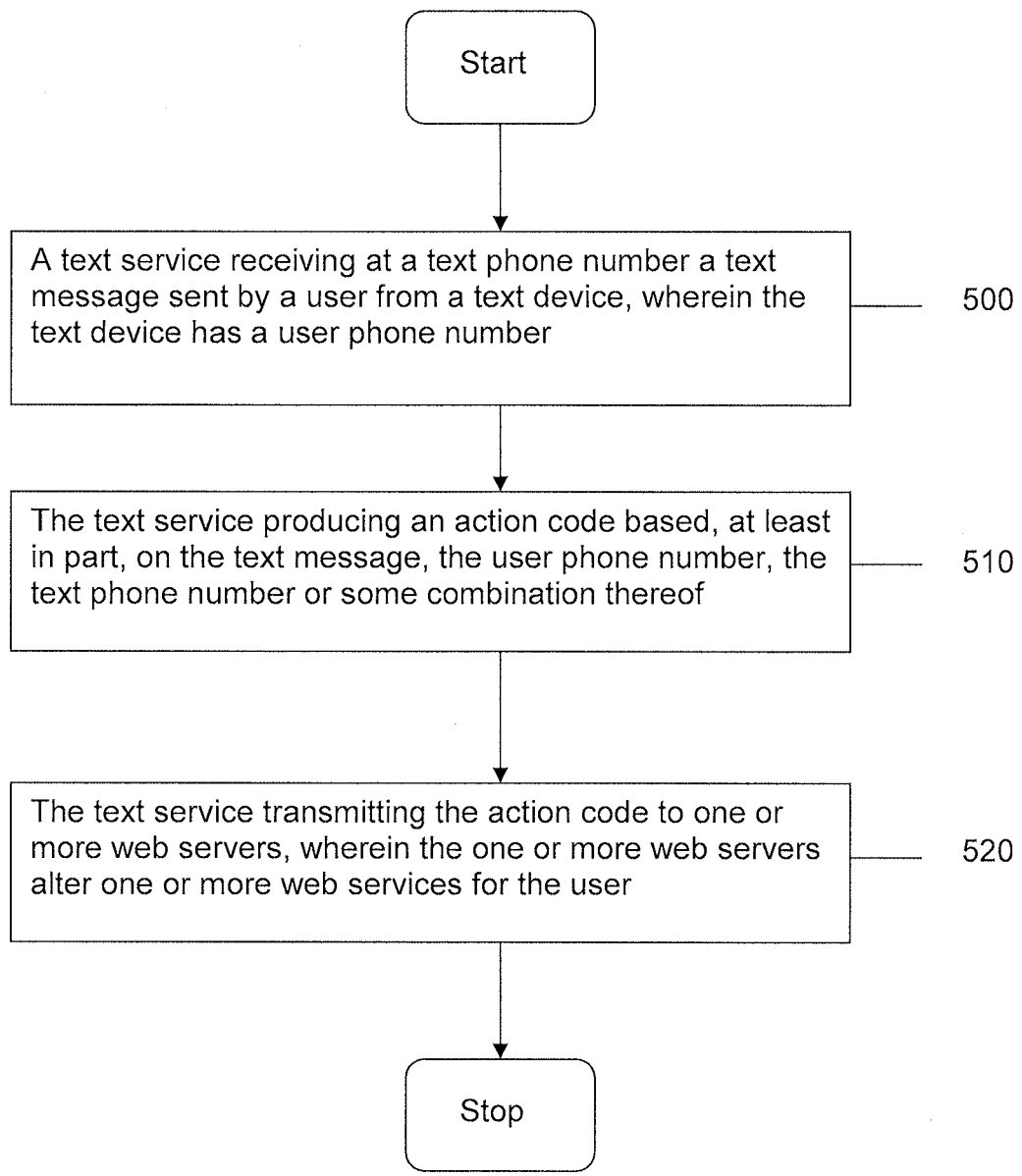
FIG. 5 is a flow diagram illustrating a third embodiment of a user modifying a web service based on a text message sent to a text service.

Another embodiment is illustrated in FIG. 5. As described for other embodiments, a text service 130, running on one or more hardware servers 101, may receive over a network 140 a text message sent to a first text phone number 131 from a first text device 151 by a first user 150, wherein the first text device 151 may have a first user phone number 152. (Step 500)

The text service 130 may comprise a plurality of text phone numbers 131, 132, 139. The text service 130 may produce, for each text phone number, in a plurality of text phone numbers 131, 132, 139, the same action code (if a standard method is being used) or a different action code (if a custom method is being used) when receiving a text message from a text device 151, 161.

The text service 130 may produce an action code based, at least in part, on the text message, the first text phone number 131, the first user phone number and/or some combination thereof. (Step 510) The text service 130 may determine an account of the user 150, in a plurality of users, based on the first user phone number 152.

The text service 130 may transmit the action code to, as a non-limiting example, an exposed API on one or more web servers 120, wherein the one or more web servers 120 may alter one or more web services. (Step 520)

Figure 6:
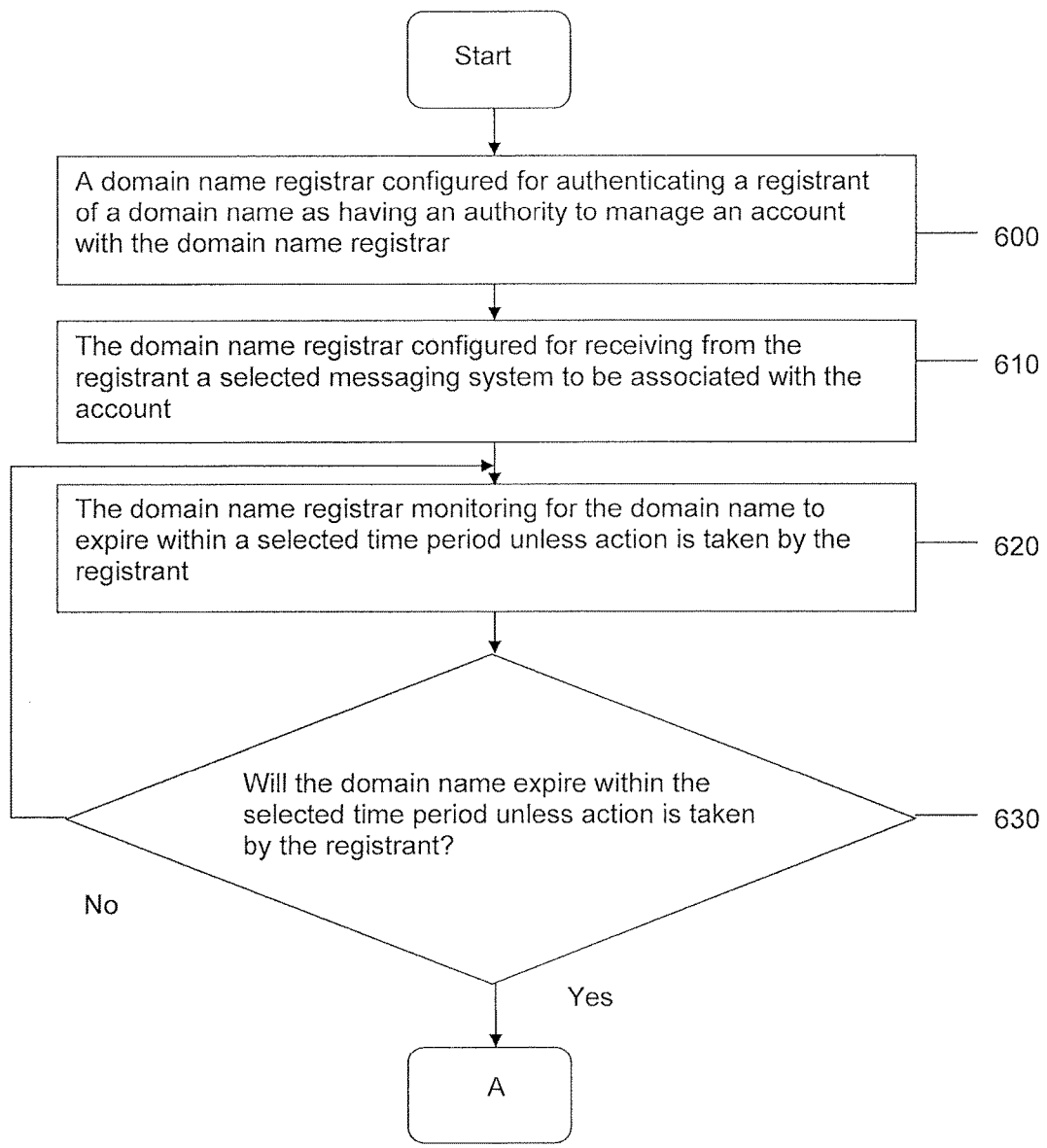
FIGS. 6 and 7 are flow diagrams illustrating an embodiment of a domain name registrant renewing an expiring domain name after receiving a reminder via a selected messaging system from a domain name registrar.
Figure 7:
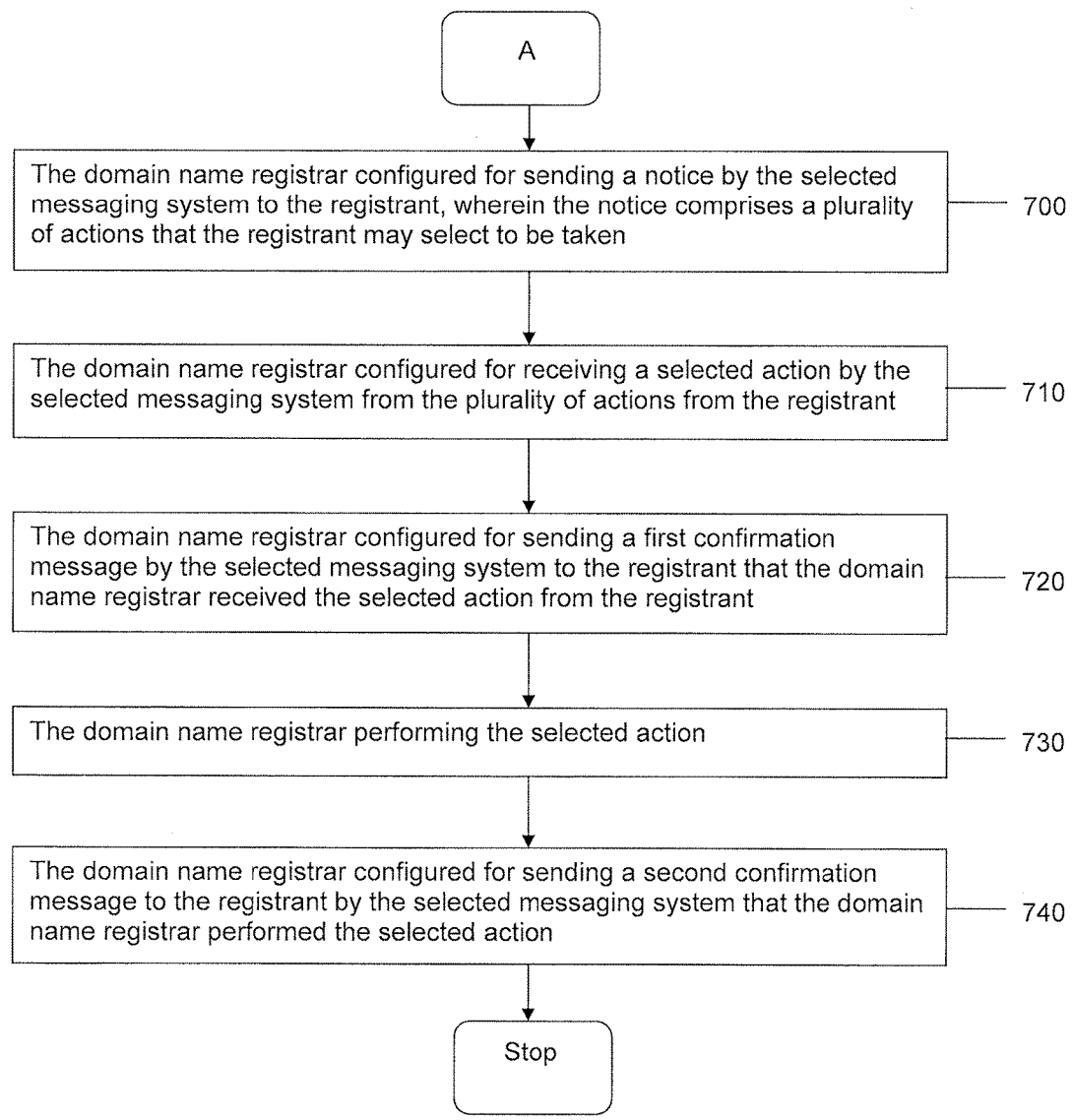

FIGS. 6 and 7 are flow diagrams illustrating an embodiment of a domain name registrant renewing an expiring domain name registered to the registrant after receiving a notice via a selected messaging system from a domain name registrar. The domain name registrar comprises the hardware (hardware servers, hardware storage media, microprocessors, cables, hardware routers, communication equipment, etc.) and software necessary to register and manage a plurality of domain names for a plurality of domain name registrants. Hardware is hereby defined to comprise mechanical devices that may include software, but that are not purely software. Each registrant may have authority to control one or more domain names in one or more accounts managed by the domain name registrar.

The domain name registrar may authenticate a registrant of a domain name as having authority to control an account managed by the domain name registrar. (Step 600) The authentication may be based on: 1) the user knowing an account name and an associated password for an account, 2) the user demonstrating access to an email account or a third party social media platform account, 3) the user demonstrating control over a domain name or a website, 4) the user providing biometrics (such as, as non-limiting examples, the finger or thumb print or an eye scan of the registrant) known to match the biometrics of the registrant, 5) the user possessing a private key in a PKI system, 6) linking the user to a home address and/or a phone number or 7) any other desired method of authenticating the registrant of the domain name. The authentication of the registrant is preferably a one-time authentication that is not repeated when selecting and/or monitoring additional events.

The domain name registrar may receive from the registrant a selected messaging system to be associated with the account. (Step 610) As non-limiting examples, the domain name registrar may offer and/or the registrant may select a selected messaging system of: 1) SMS or MMS messages to and from a particular cell phone having a cell phone number, 2) messages to and from an application running on a mobile device, 3) emails to and from an email account, 4) interaction with a webpage, 5) messages to and from an account with a social media platform (such as, as non-limiting examples, Facebook, Twitter, LinkedIn, Pinterest, Google Plus+, Tumbler, Instagram, VK, Flickr, Vine, Meetup, Tagged, Ask.fm, MeetMe or ClassMates) or a messaging app (such as, as non-limiting examples, Skype, WhatsApp, Messenger, Line, Snapchat, Webchat or iMessage) or 6) any other desired method of securely communicating between the domain name registrar and the registrant.

The domain name registrant may use the selected messaging system associated with the account to make any desired changes to the user account, user email and/or user website. As non-limiting examples, the domain name registrant may update zone file records or apply DNS templates, update domain name contact information, request a transfer code to transfer the domain name between different registrars, add or remove privacy settings for one or more domain names, add or remove email accounts and/or manage permissions (including delegation) for website hosting accounts, add, remove, edit or move images to a website and add, delete and/or edit inventory for a website.

The domain name registrar may monitor one or more events for a domain name. As non-limiting examples, the domain name registrar may monitor: 1) the approach of a predetermined time before the expiration date for a domain name, 2) the change in availability of a desired domain name registered to a different registrant, 3) offers to buy a domain name registered to the registrant, 4) the chance to bid on an domain name auction 5) or any other desired event the registrant wishes to monitor. In some embodiments, the user may select one or more events (and corresponding thresholds if relevant) that are to be monitored. In other embodiments, the domain name registrar may automatically (without input from the registrant) select one or more events and thresholds that are to be monitored for the registrant.

The user may not always respond in a timely manner to communications. In such cases the domain name registrar may queue the notifications and resend the communications to the user at a later date. If the user does not respond after, as non-limiting examples, two or three attempts, the domain name registrar may send the communication by other known means of communicating with the user. If the user still does not respond to the other known means of communicating with the user, the domain name registrar may perform one or more default processes, the default processes are preferably previously selected by the user and/or communicated to the user to happen if the user cannot be contacted.

As a non-limiting example, the registrant may select that the domain name registrar monitor for a specified domain name to expire within a selected time period (such as 30 days) and for a different domain name registered to a different registrant becomes available for registration. (Step 620) In this example, the domain name registrar would monitor and determine when the selected domain name was 30 days away from expiring and when the different domain name became available for registration. When either (or both) event occurs, the following notification process may be performed.

Upon the domain name registrar detecting a monitored event, such as a domain name will expire within a selected time period unless action is taken by the registrant, the domain name registrar may initiate communication with the registrant to try to resolve the monitored event. (Step 630)

The domain name registrar may send a notice by the selected messaging system to the registrant. The notice may include a plurality of actions that the registrant may select to be taken. As a non-limiting example, the event monitored may be the expiration of a domain name. As non-limiting examples, the domain name registrar may send the options to 1) renew the domain name (the payment method, such as a credit card, may already by on file or entered by the registrant), 2) let the domain name expire or 3) send another notice at a later date (such as a 15 day reminder before the domain name expires). (Step 700) The registrant may select one of the actions.

The domain name registrar may receive the selected action from the plurality of actions, from the registrant via the selected messaging system. (Step 710)

In some embodiments, the domain name registrar may send a first confirmation message by the selected messaging system that the domain name registrar received the selected action from the registrant. (Step 720) The first confirmation message is a courtesy message that is optional and does not have to be performed in every embodiment.

The domain name registrar may perform the selected action. (Step 730) As an example, if the registrant was presented with an option to renew a domain name and the registrant selected the option to renew the domain name, the domain name registrar may renew the domain name for the registrant.

The domain name registrar may send to the registrant a second confirmation message by the selected messaging system that the domain name registrar performed the selected action. (Step 740) If the domain name registrar was not able to perform the selected action, the domain name registrar may send to the registrant the second confirmation message by the selected messaging system that the domain name registrar did not perform the selected action.

Figure 8:
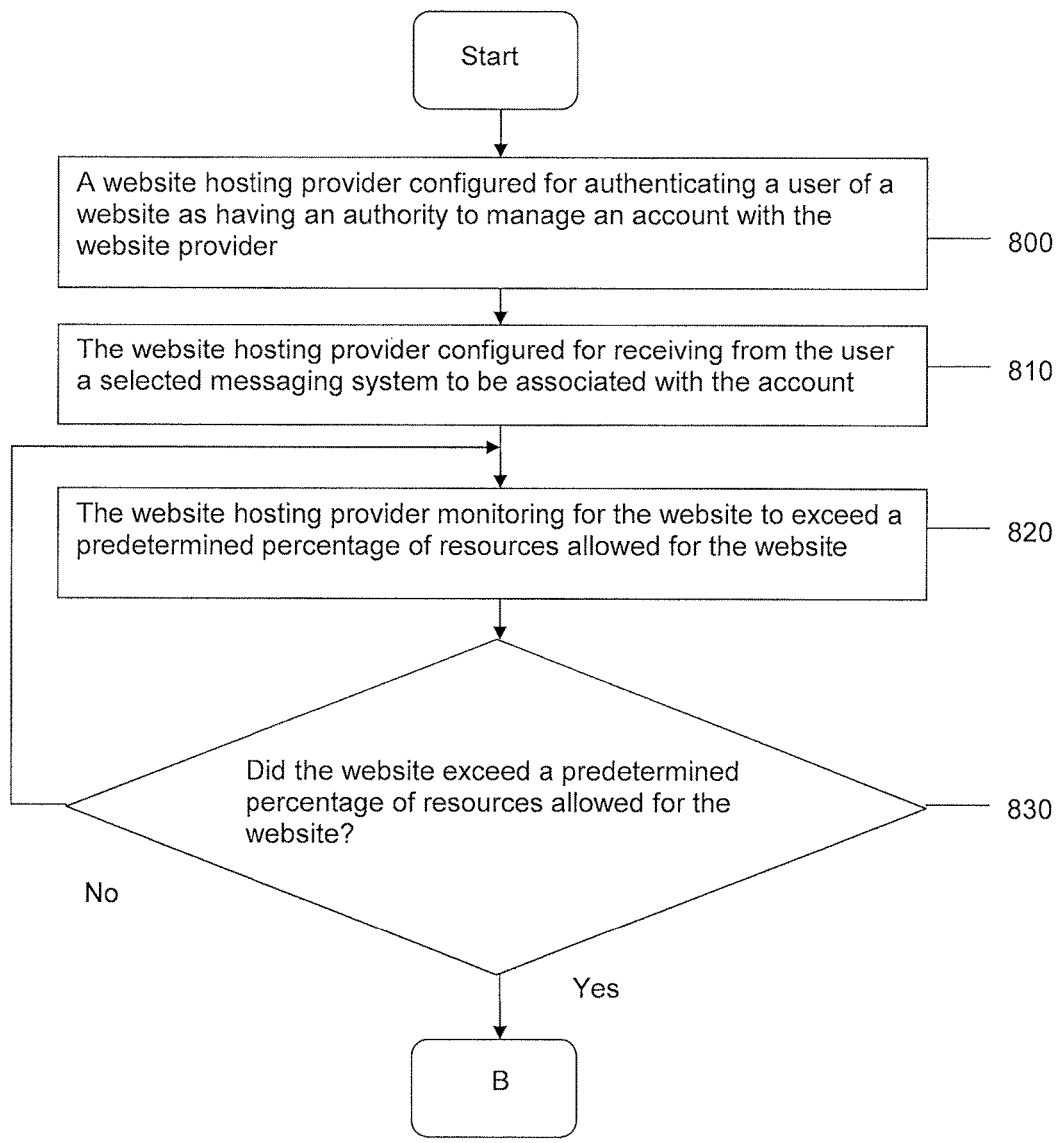
FIGS. 8 and 9 are flow diagrams illustrating an embodiment of a user selecting an option (possibly to purchase additional resources for the user's website) after receiving a reminder via a selected messaging system from a website hosting provider.
Figure 9:
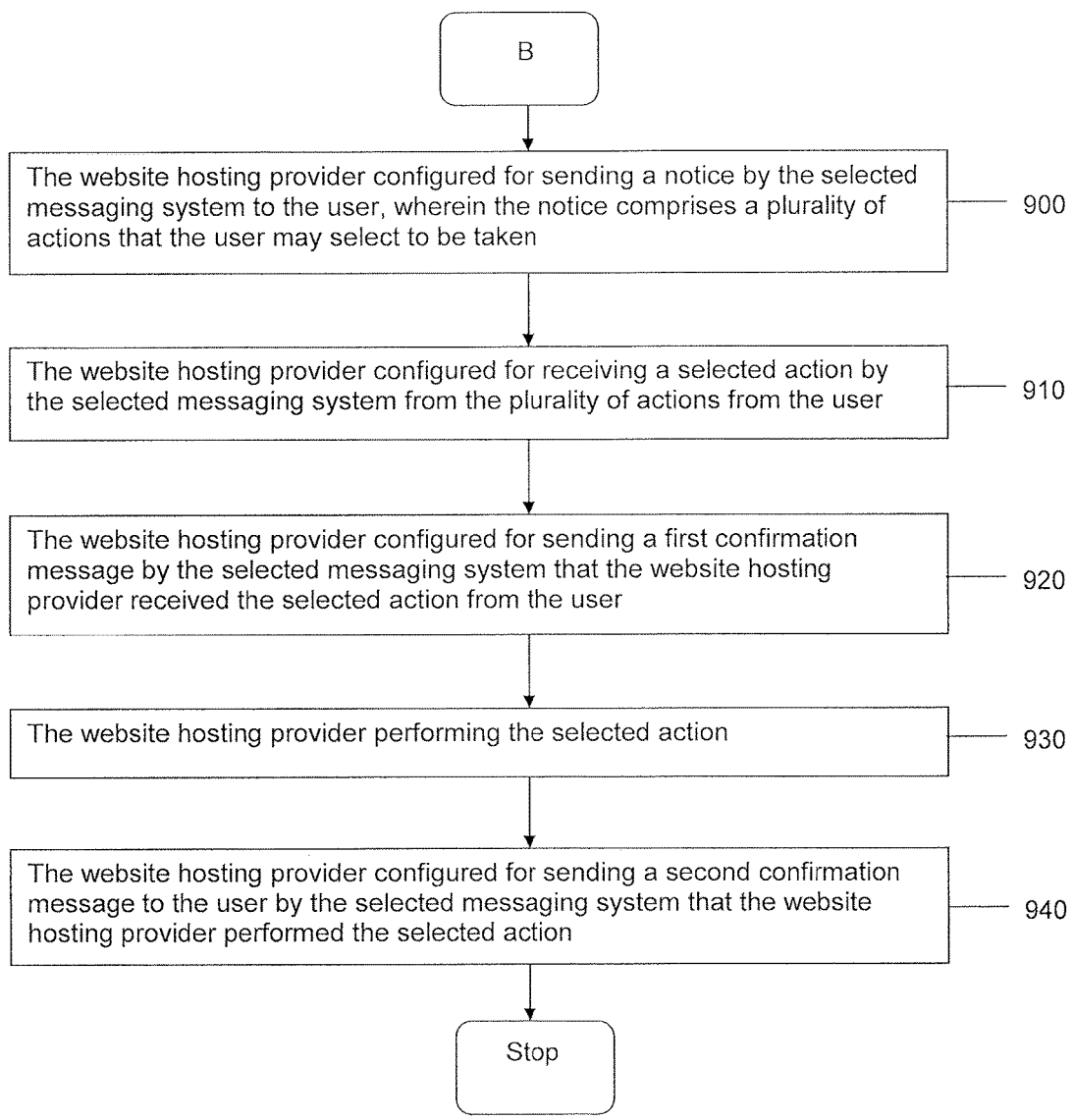

FIGS. 8 and 9 are flow diagrams illustrating an embodiment of a user selecting an option (possibly to purchase additional resources for the user's website) after receiving a reminder via a selected messaging system from a website hosting provider. The website hosting provider comprises the hardware (hardware servers, hardware storage media, microprocessors, cables, hardware routers, communication equipment, etc.) and software necessary to host and manage a plurality of websites for a plurality of users. Hardware is hereby defined to comprise mechanical devices that may include software, but that are not purely software. Each user may have authority to control one or more websites in one or more accounts managed by the hosting provider.

The website hosting provider may authenticate a user as having authority to control an account managed by the website hosting provider. (Step 800) The authentication may be based on: 1) the user knowing an account name and an associated password for an account, 2) the user demonstrating access to an email account or a third party social media platform account, 3) the user demonstrating control over a domain name or a website, 4) the user provides biometrics (such as, as non-limiting examples, the finger or thumb print or an eye scan of the user) known to match the biometrics of the user, 5) the user possesses a private key in a PKI system or 6) any other desired method of authenticating the user. The authentication of the user is preferably a one-time authentication that is not repeated when selecting and/or monitoring additional events.

The website hosting provider may receive from the user a selected messaging system to be associated with the account. (Step 810) As non-limiting examples, the website hosting provider may offer and/or the user may select a selected messaging system of: 1) SMS or MMS messages to and from a particular cell phone having a unique cell phone number, 2) messages to and from an application running on a mobile device, 3) emails to and from an email account, 4) interaction with a webpage, 5) messages to and from an account with a social media platform (such as, as non-limiting examples, Facebook, Twitter, LinkedIn, Pinterest, Google Plus+, Tumbler, Instagram, VK, Flickr, Vine, Meetup, Tagged, Ask.fm, MeetMe or ClassMates) or 6) any other desired method of securely communicating between the website hosting provider and the user.

The website hosting provider may monitor one or more events for a website. As non-limiting examples, the website hosting provider may monitor: 1) the approach of a predetermined time before the expiration date of a hosting plan for the website, 2) the approach of a predetermined percentage of resources used by the website, such as, as non-limiting examples, a bandwidth usage or a memory usage of the website, 3) a reduction in price for the website or other promotional advertisements related to the website, 4) new features (such as new templates or graphics) have become available for the website, 5) traffic spikes to the website (the user may be allowed to add additional resources for the website and/or migrate the website to a different or a local content delivery network (CDN)) or 6) any other desired event the user wishes to monitor. In some embodiments, the user may select one or more events (and corresponding thresholds if relevant) that are to be monitored for the website. In other embodiments, the website hosting provider may automatically (without input from the user) select one or more events and thresholds that are to be monitored for the user. Any number of different events with or without associated thresholds related to the website may be monitored.

As a non-limiting example, the user may select that the website hosting provider monitor for a predetermined percentage of resources allowed for the website to be exceeded, such as 80% of the allotted bandwidth for the website and 90% of the allotted memory for the website. (Step 820) In this example, the website hosting provider would monitor and determine when the selected website reached or exceeded 80% of the allotted bandwidth and/or 90% of the allotted memory for the website. When either (or both) event occurs, the following notification process may be performed.

Upon the website hosting provider detecting a monitored event, such as a website will reach or exceed a predetermined percentage of resources allowed for the website, the website hosting provider may initiate communication with the user to try to resolve the monitored event. (Step 830)

The website hosting provider may send a notice by the selected messaging system to the user. The notice may include a plurality of actions that the user may select to be taken. As a non-limiting example, the event monitored may be when 75% of the allotted bandwidth for a website is used. As non-limiting examples, the website hosting provider may send the options to 1) purchase an increased amount of bandwidth (the payment method, such as a credit card, may already by on file or entered by the user), 2) let the website go over the allotted bandwidth and pay overage fees later or 3) send another notice when a higher percentage of allotted bandwidth for the website is used (such as when 90% of the allotted bandwidth for the website is used). (Step 900) The user may select one of the actions.

The website hosting provider may receive the selected action, from the plurality of actions, from the user via the selected messaging system. (Step 910)

In some embodiments, the website hosting provider may send a first confirmation message by the selected messaging system that the website hosting provider received the selected action from the user. (Step 920) The first confirmation message is a courtesy message that is optional and does not have to be performed in every embodiment.

The website hosting provider may perform the selected action. (Step 930) As an example, if the user was presented with an option to increase an allotted resource to a new level, such as bandwidth usage or memory usage, the website hosting provider may increase the amount of resources assigned to the website to the new level.

The website hosting provider may send to the user a second confirmation message by the selected messaging system that the website hosting provider performed the selected action. (Step 940) If the website hosting provider was not able to perform the selected action, the website hosting provider may send to the user the second confirmation message by the selected messaging system that the website hosting provider did not perform the selected action.

Figure 10:
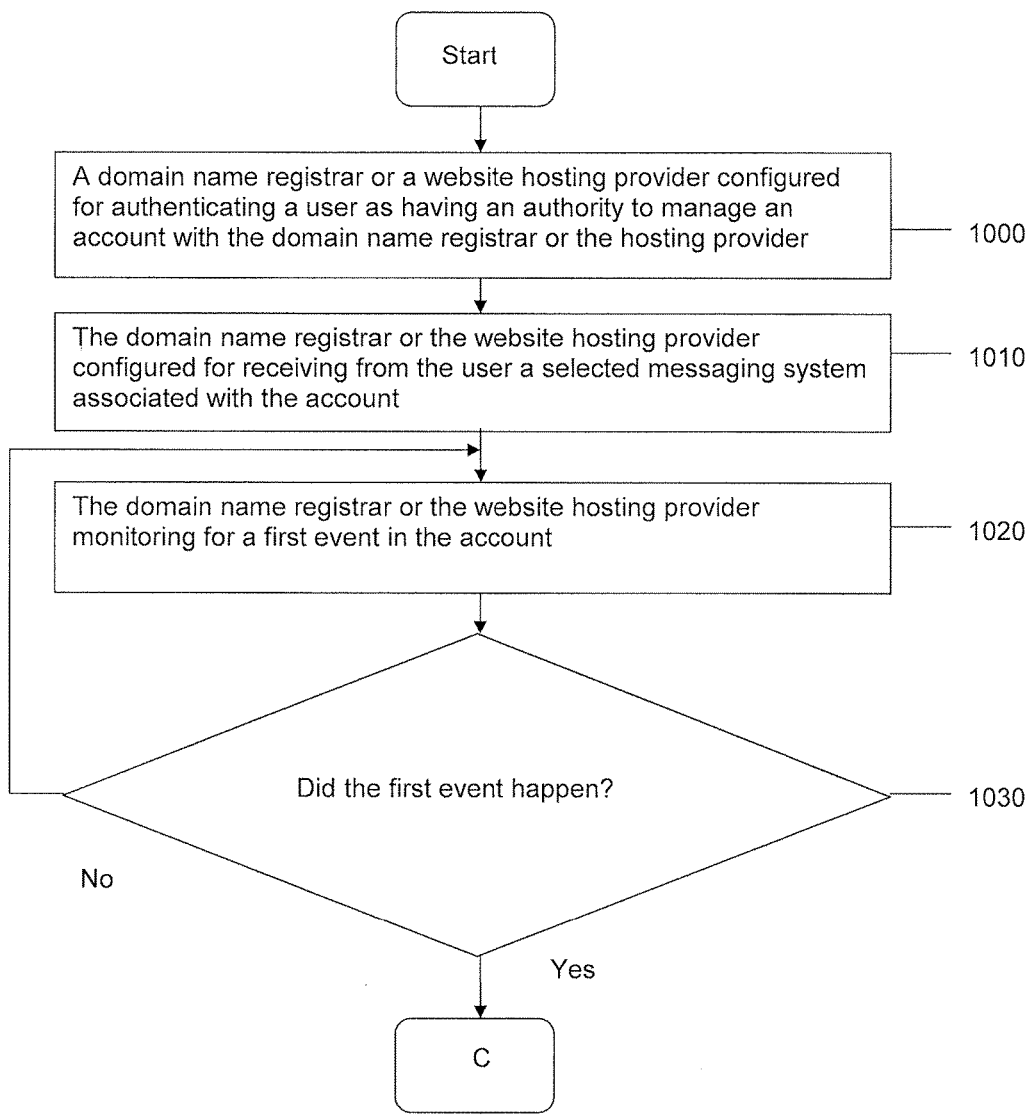
FIGS. 10 and 11 are flow diagrams illustrating an embodiment of a user selecting an option (possibly to renew a domain name or to purchase additional resources for the user's website) after receiving a reminder via a selected messaging system from a domain name registrar or a website hosting provider.
Figure 11:
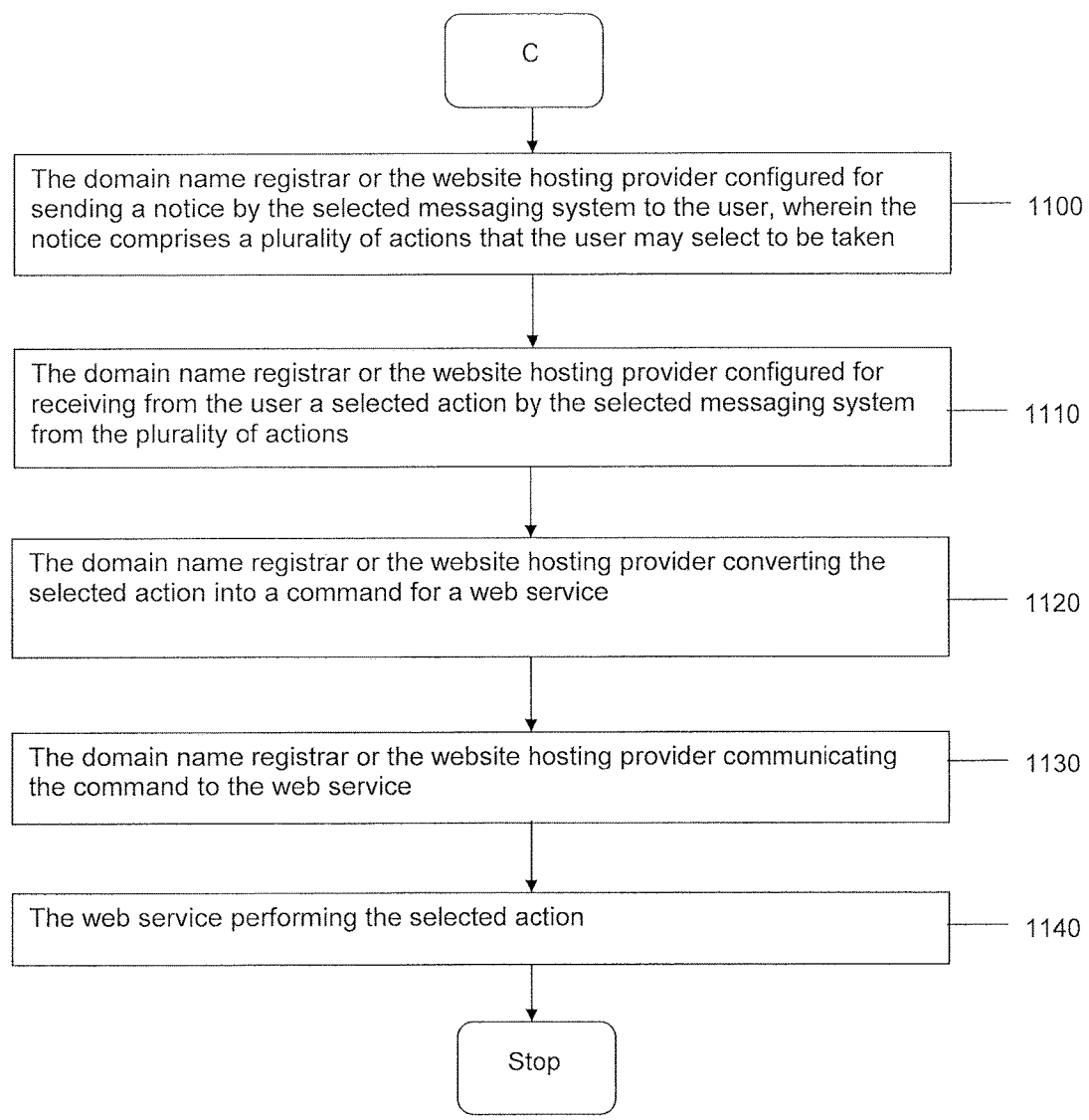

FIGS. 10 and 11 are flow diagrams illustrating an embodiment of a user selecting an option (possibly to renew a domain name or to purchase additional resources for the user's website) after receiving a reminder via a selected messaging system from a domain name registrar or a website hosting provider.

The domain name registrar or the website hosting provider may authenticate a user as having authority to control an account managed by the domain name registrar or the website hosting provider. (Step 1000) The authentication may be based on: 1) the user knowing an account name and an associated password for an account, 2) the user demonstrating access to an email account or a third party social media platform account, 3) the user demonstrating control over a domain name or a website, 4) the user provides biometrics (such as, as non-limiting examples, the finger or thumb print or an eye scan of the user) known to match the biometrics of the user, 5) the user possesses a private key in a PKI system or 6) any other desired method of authenticating the user. The authentication of the user is preferably a one-time authentication that is not repeated when selecting and/or monitoring additional events.

The domain name registrar or the website hosting provider may receive from the user a selected messaging system associated with the account. (Step 1010)

The domain name registrar or the website hosting provider may monitor one or more events for a domain name or for a website. (Step 1020) Any number of different events with or without associated thresholds related to the domain name or the website may be monitored.

Upon the domain name registrar or the website hosting provider detecting a monitored event, the domain name registrar or the website hosting provider may initiate communication with the user to try to resolve the monitored event. (Step 1030)

The domain name registrar or the website hosting provider may send a notice by the selected messaging system to the user. The notice may include a plurality of actions that the user may select to be taken. (Step 1100) The user may select one of the actions.

The domain name registrar or the website hosting provider may receive the selected action, from the plurality of actions, from the user via the selected messaging system. (Step 1110)

The domain name registrar or the website hosting provider may convert the selected action into a command for a web service. (Step 1120) The domain name registrar or the website hosting provider may communicate the command to the web service. (Step 1130) The web service may perform the selected action based on the command from the domain name registrar or the website hosting provider. (Step 1140)

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
   a) a domain name registrar authenticating a registrant of a domain name as having an authority to manage an account with the domain name registrar, wherein the domain name registrar has domain name registration capabilities and website hosting capabilities and the registrant of the domain name is also a user of a website managed from the account with the domain name registrar;
   b) the domain name registrar receiving from the registrant a selected messaging system to be associated with the account;
   c) the domain name registrar monitoring for the domain name to expire within a selected time period unless action is taken by the registrant;
   d) upon the domain name registrar detecting the domain name will expire within the selected time period unless action is taken by the registrant:
      i) the domain name registrar sending a notice by the selected messaging system to the registrant, wherein the notice comprises a plurality of actions that the registrant may select one of to be taken, wherein the plurality of actions that the registrant may select one of comprises renewing the domain name and allowing the domain name to expire;
      ii) the domain name registrar receiving a selected action by the selected messaging system from the plurality of actions from the registrant;

iii) the domain name registrar sending a first confirmation message by the selected messaging system to the registrant that the domain name registrar received the selected action from the registrant;
iv) the domain name registrar performing the selected action of renewing the domain name or allowing the domain name to expire; and
v) the domain name registrar sending a second confirmation message to the registrant by the selected messaging system that the domain name registrar performed the selected action of renewing the domain name or allowing the domain name to expire;

e) the domain name registrar monitoring for the website to exceed a predetermined percentage of resources allowed for the website; and f) upon the domain name registrar detecting the website exceeded the predetermined percentage of resources allowed for the website:
  i) the domain name registrar sending a notice by the selected messaging system to the registrant, wherein the notice comprises a plurality of actions that the registrant may select one of to be taken, wherein the plurality of actions that the registrant may select one of comprises purchasing additional resources for the website and allowing the website to exceed the resources allowed for the website;
  ii) the domain name registrar receiving a selected action by the selected messaging system from the plurality of actions from the registrant;
  iii) the domain name registrar sending a first confirmation message by the selected messaging system that the domain name registrar received the selected action from the registrant;
  iv) the domain name registrar performing the selected action of purchasing additional resources for the website or allowing the website to exceed the resources allowed for the website; and
  v) the domain name registrar sending a second confirmation message to the registrant by the selected messaging system that the domain name registrar performed the selected action of purchasing additional resources for the website or allowing the website to exceed the resources allowed for the website.

2. The method of claim 1, further comprising the step of:
g) the domain name registrar receiving from the registrant a plurality of events to monitor, wherein the plurality of events comprises the monitoring for the domain name to expire within the selected time period unless action is taken by the registrant.

3. The method of claim 1, further comprising the step of:
g) the domain name registrar receiving from the registrant the selected time period.

4. The method of claim 1, wherein the authenticating is a one-time authentication that is not repeated when additional events are selected by the registrant to be monitored by the domain name registrar.

5. The method of claim 1, wherein the selected messaging system comprises a cell phone telephone number to a cell phone configured to receive and send a Short Message Service or a Multimedia Messaging Service message to the registrant.

6. The method of claim 1, wherein the selected messaging system comprises an application stored on a cell phone configured to receive and send messages to the registrant.

7. The method of claim 1, wherein the selected messaging system comprises a third party social media platform.

* * * * *